US012574909B2

(12) United States Patent
Morper et al.

(10) Patent No.: US 12,574,909 B2
(45) Date of Patent: Mar. 10, 2026

(54) TIME SYNCHRONIZATION IN A COMMUNICATION SYSTEM

(71) Applicant: NOKIA SOLUTIONS AND NETWORKS OY, Espoo (FI)

(72) Inventors: Hans-Jochen Morper, Erdweg (DE); Zexian Li, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 314 days.

(21) Appl. No.: 18/496,272

(22) Filed: Oct. 27, 2023

(65) Prior Publication Data

US 2024/0163852 A1      May 16, 2024

(30) Foreign Application Priority Data

Nov. 15, 2022      (FI) ..................................... 20226027

(51) Int. Cl.
*H04W 72/0446* (2023.01)
*H04L 5/14* (2006.01)
*H04W 72/12* (2023.01)

(52) U.S. Cl.
CPC ....... *H04W 72/0446* (2013.01); *H04L 5/1469* (2013.01); *H04W 72/12* (2013.01)

(58) Field of Classification Search
None
See application file for complete search history.

(56) References Cited

U.S. PATENT DOCUMENTS

| | | | |
|---|---|---|---|
| 2015/0215821 A1* | 7/2015 | Zhang | H04W 56/00 370/252 |
| 2017/0244813 A1* | 8/2017 | Hammel | H04L 69/28 |
| 2020/0404683 A1* | 12/2020 | Houghton | H04W 72/23 |
| 2021/0251012 A1 | 8/2021 | Shrestha et al. | |
| 2022/0070808 A1 | 3/2022 | Jacobsen et al. | |
| 2022/0256350 A1 | 8/2022 | Bernsen | |

OTHER PUBLICATIONS

Extended European Search Report dated Apr. 15, 2024 corresponding to European Patent Application No. 23204812.4.
Intel Corporation, "Pre-compensation at the gNB for RTT andTA based PDC," 3GPP Draft; R2-2104886, d3GPP TSG RAN WG2 Meeting #114e, May 11, 2021, XP052006629.

* cited by examiner

*Primary Examiner* — Robert M Morlan
(74) *Attorney, Agent, or Firm* — SQUIRE PATTON BOGGS (US) LLP

(57)      ABSTRACT

The present subject matter relates to an apparatus for time synchronization in a wireless communication system using resources which are allocated in time domain for a set of user apparatuses of the wireless communication system. The apparatus comprises means being configured for: selecting a user apparatus of the set of user apparatuses; using the allocated resources for selecting a scheduled transmission time for the selected user apparatus; estimating a propagation time of a message from the apparatus to the selected user apparatus; estimating an arrival time of the message at the selected user apparatus using the scheduled transmission time and the propagation time; providing according to the scheduled transmission time a message including the estimated arrival time.

16 Claims, 9 Drawing Sheets

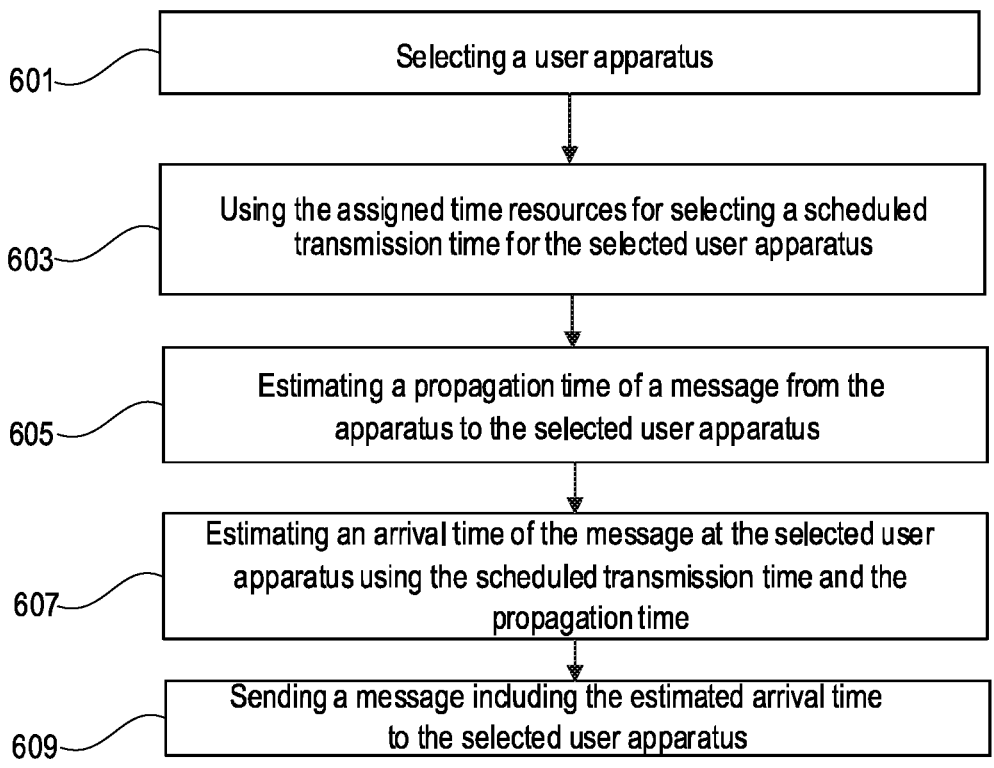

601 — Selecting a user apparatus

603 — Using the assigned time resources for selecting a scheduled transmission time for the selected user apparatus 605 — Estimating a propagation time of a message from the apparatus to the selected user apparatus 607 — Estimating an arrival time of the message at the selected user apparatus using the scheduled transmission time and the propagation time 609 — Sending a message including the estimated arrival time to the selected user apparatus

Fig. 6

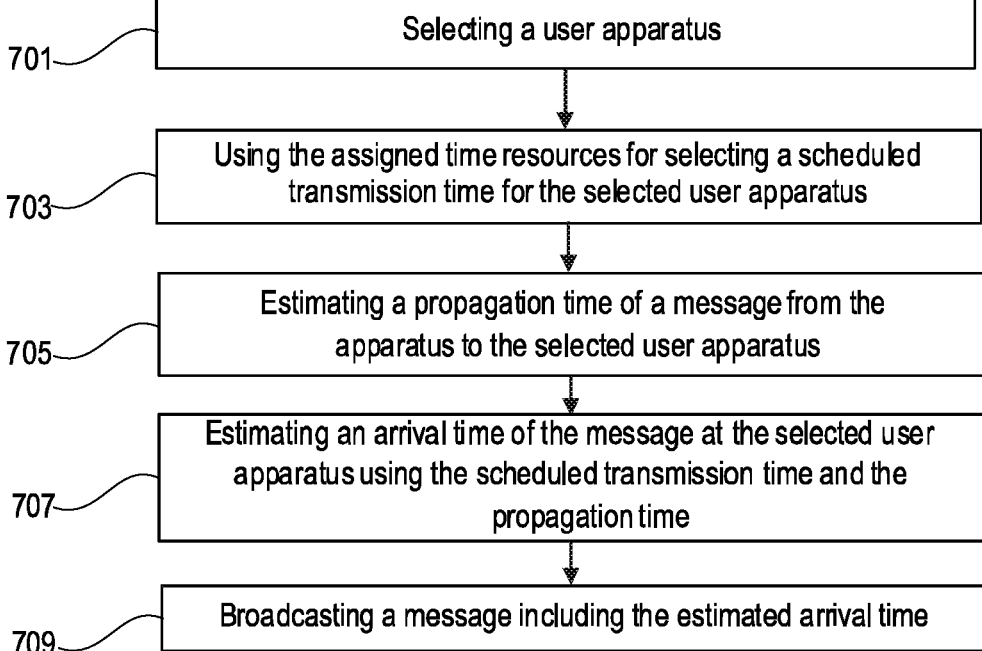

701 — Selecting a user apparatus

703 — Using the assigned time resources for selecting a scheduled transmission time for the selected user apparatus 705 — Estimating a propagation time of a message from the apparatus to the selected user apparatus 707 — Estimating an arrival time of the message at the selected user apparatus using the scheduled transmission time and the propagation time 709 — Broadcasting a message including the estimated arrival time

Fig. 7

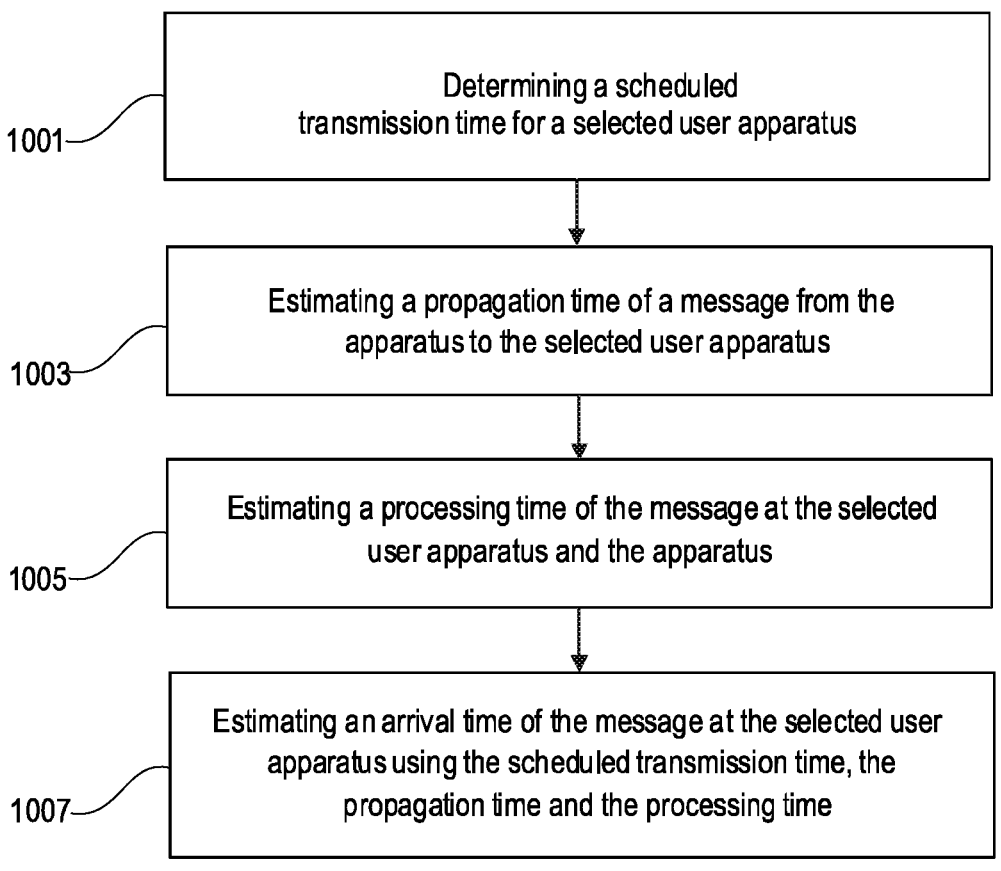

1001 — Determining a scheduled transmission time for a selected user apparatus

1003 — Estimating a propagation time of a message from the apparatus to the selected user apparatus

1005 — Estimating a processing time of the message at the selected user apparatus and the apparatus

1007 — Estimating an arrival time of the message at the selected user apparatus using the scheduled transmission time, the propagation time and the processing time

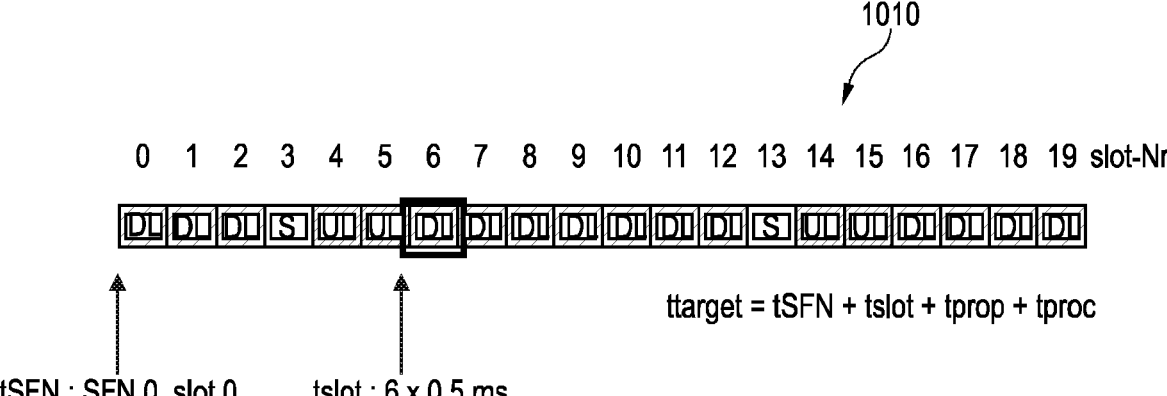

0 1 2 3 4 5 6 7 8 9 10 11 12 13 14 15 16 17 18 19 slot-Nr ttarget = tSFN + tslot + tprop + tproc tSFN : SFN 0, slot 0        tslot : 6 x 0.5 ms

Fig. 11

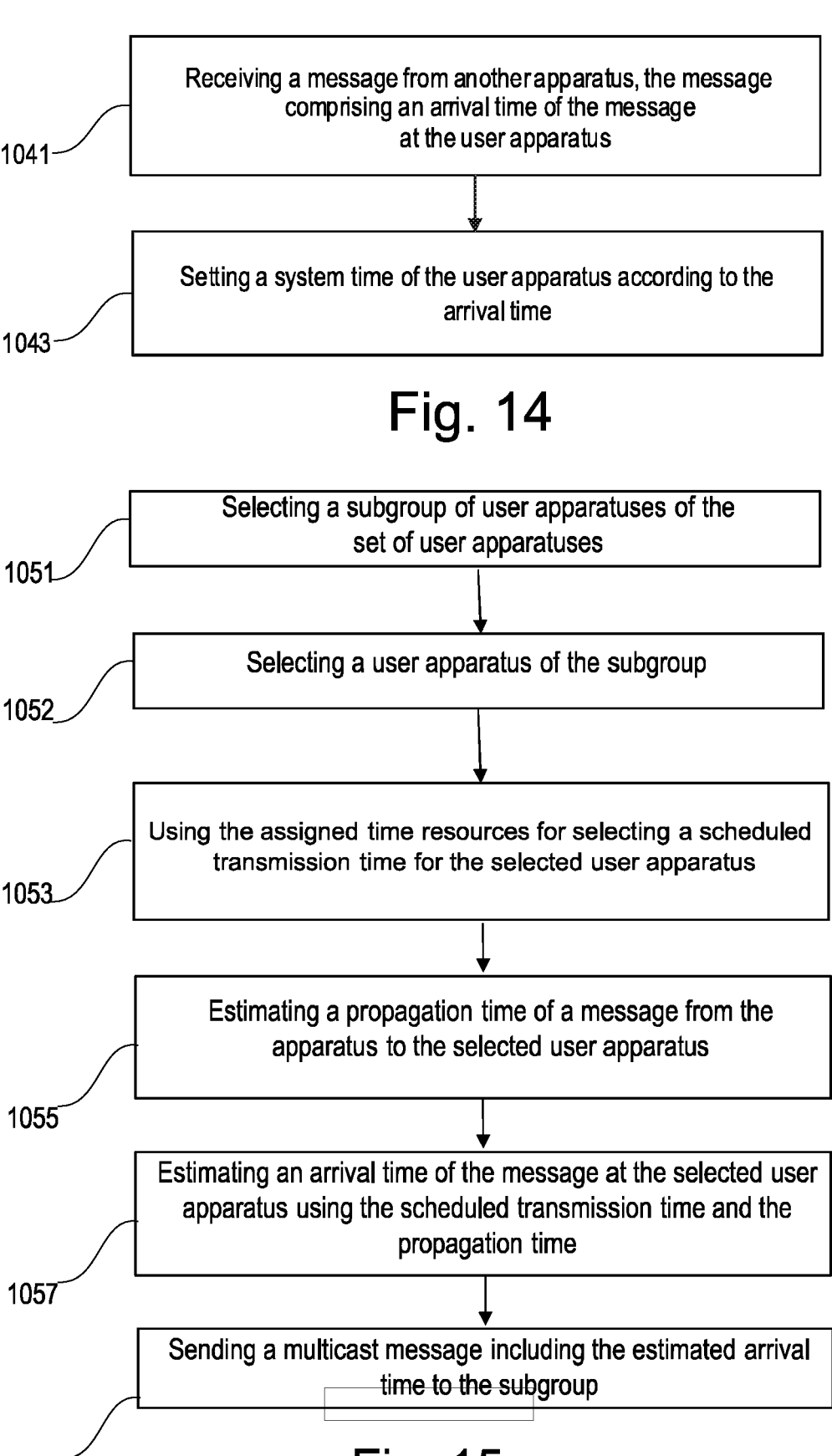

1041 — Receiving a message from another apparatus, the message comprising an arrival time of the message at the user apparatus 1043 — Setting a system time of the user apparatus according to the arrival time

Fig. 14

1051 — Selecting a subgroup of user apparatuses of the set of user apparatuses

1052 — Selecting a user apparatus of the subgroup

1053 — Using the assigned time resources for selecting a scheduled transmission time for the selected user apparatus 1055 — Estimating a propagation time of a message from the apparatus to the selected user apparatus 1057 — Estimating an arrival time of the message at the selected user apparatus using the scheduled transmission time and the propagation time 1059 — Sending a multicast message including the estimated arrival time to the subgroup

Fig. 15

TIME SYNCHRONIZATION IN A COMMUNICATION SYSTEM

CROSS REFERENCE TO RELATED APPLICATION

This application claims the benefit of Finnish Patent Application No. 20226027, filed Nov. 15, 2022. The entire content of the above-referenced application is hereby incorporated by reference.

TECHNICAL FIELD

Various example embodiments relate to telecommunication systems, and more particularly to time synchronization in a communication system.

BACKGROUND

Time synchronization is a common feature of information technology (IT) and Operational technology (OT) networks and may be needed whenever peering nodes of a network require to act simultaneously. However, there are different levels of synchronicity ranging from seconds to sub-micro seconds (sub-µs).

SUMMARY

Example embodiments provide an apparatus for time synchronization in a wireless communication system using resources which are allocated in time domain for a set of user apparatuses of the wireless communication system. The apparatus comprises means being configured for: selecting a user apparatus of the set of user apparatuses; using the allocated resources for selecting a scheduled transmission time for the selected user apparatus; estimating a propagation time of a message from the apparatus to the selected user apparatus; estimating an arrival time of the message at the selected user apparatus using the scheduled transmission time and the propagation time; providing according to the scheduled transmission time a message including the estimated arrival time.

Example embodiments provide a method for time synchronization in a wireless communication system using resources which are allocated in time domain for a set of user apparatuses of the wireless communication system. The method comprises: selecting a user apparatus of the set of user apparatuses; using the allocated resources for selecting a scheduled transmission time for the selected user apparatus; estimating a propagation time of a message from the apparatus to the selected user apparatus; estimating an arrival time of the message at the selected user apparatus using the scheduled transmission time and the propagation time; providing according to the scheduled transmission time a message including the estimated arrival time.

Example embodiments provide a computer program comprising instructions for causing an apparatus for performing at least the following: selecting a user apparatus of a set of user apparatuses; using resources for the set of user apparatuses for selecting a scheduled transmission time for the selected user apparatus; estimating a propagation time of a message from the apparatus to the selected user apparatus; estimating an arrival time of the message at the selected user apparatus using the scheduled transmission time and the propagation time; providing according to the scheduled transmission time a message including the estimated arrival time.

Example embodiments provide a user apparatus comprising means being configured for: receiving a message from another apparatus, the message comprising an arrival time of the message at the user apparatus; setting a system time of the user apparatus according to the arrival time.

Example embodiments provide a method comprising: receiving by a user apparatus a message from another apparatus, the message comprising an arrival time of the message at the user apparatus; setting by the user apparatus a system time of the user apparatus according to the arrival time.

Example embodiments provide a computer program comprising instructions for causing an apparatus for performing at least the following: receiving a message from another apparatus, the message comprising an arrival time of the message at the user apparatus; setting a system time of the user apparatus according to the arrival time.

BRIEF DESCRIPTION OF THE DRAWINGS

The accompanying figures are included to provide a further understanding of examples, and are incorporated in and constitute part of this specification. In the figures:

FIG. 6 is a flowchart of a method for providing timing information according to an example of the present subject matter;

FIG. 7 is a flowchart of a method for providing timing information according to an example of the present subject matter;

FIG. 10 is a flowchart of a method for estimating an arrival time of a message according to an example of the present subject matter;

FIG. 11 illustrates an example of time domain allocated resources;

FIG. 14 is a flowchart of a method for time synchronization according to an example of the present subject matter;

FIG. 15 is a flowchart of a method for providing timing information according to an example of the present subject matter.

DETAILED DESCRIPTION

Figure 1:
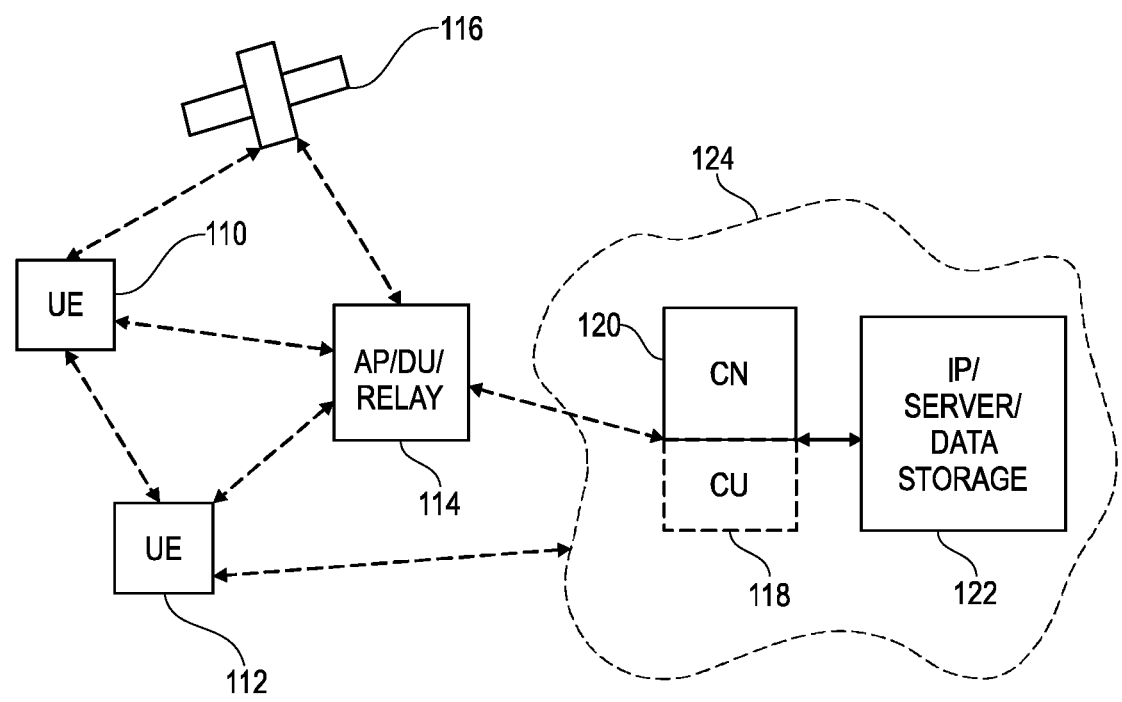
FIG. 1 illustrates a part of an exemplifying radio access network.

In the following description, for purposes of explanation and not limitation, specific details are set forth such as particular architectures, interfaces, techniques, etc., in order to provide a thorough understanding of the examples. However, it will be apparent to those skilled in the art that the disclosed subject matter may be practiced in other illustrative examples that depart from these specific details. In some instances, detailed descriptions of well-known devices and/ or methods are omitted so as not to obscure the description with unnecessary detail.

A communication system may be provided. The communication system comprises nodes such as base stations, wherein each node may serve user equipments (UEs) located within the node's geographical area of service or a cell. The communication system may support one or more radio access technologies (RATs). A radio access technology of the radio access technologies may, for example, be evolved universal terrestrial radio access (E-UTRA) or 5G new radio (NR), but it is not limited to, as a person skilled in the art may apply the present subject matter to other communication systems provided with necessary properties.

The communication system may have resources such as time resources and frequency resources. User apparatuses in the communication system may be allocated resources. For example, user apparatuses in the communication system may be allocated resources in time domain (and thus named time domain resources). This allocation may satisfy technical constraints such as interference mitigation, link budgets etc. The user apparatus may be able to send and receive data in accordance with the allocated resources. The allocation of the resources may, for example, be performed by one or more apparatuses, named herein network apparatuses, of the communication system. Each network apparatus may allocate resources for user apparatuses which are served by the network apparatus. The allocation of resources may, for example, be done according to a scheduling scheme. For example, the scheduling scheme may be a scheduling scheme in time division duplexing (TDD) mode.

The network apparatus may, for example, be a base station, e.g., a Node B, enhanced or evolved NodeB (eNB), a home eNode B (HeNB), an access point (AP), a femto node, a femto base station, gNB or any other equipment belonging to the communication system and implementing a radio communication interface with user apparatuses. Providing different types of network apparatuses may enable a flexible implementation of the present subject matter.

The user apparatus may, for example, be a terminal such as a user equipment (UE), a subscriber terminal, a smartphone, a mobile station, a mobile phone, a headset, a portable computer, a pad computer, an Industrial Internet of Things (IIoT) device, e.g. acting as switch, bridge or router, or another type of wireless mobile communication device operating with or without a subscriber identification module (SIM). Providing different types of user apparatuses may enable a flexible implementation of the present subject matter.

The time domain resources which are allocated for a user apparatus for transmitting data to the user apparatus may be referred to as downlink (DL) time resources. The time domain resources which are allocated for the user apparatus for transmitting data by the user apparatus may be referred to as uplink (UL) time resources. That is, the resources allocated for the user apparatus may comprise DL time resources and UL time resources. The UL time resources which are allocated for a user apparatus may comprise scheduled times for data transmission by the user apparatus. For example, the scheduled times for data transmission by the user apparatus may comprise time intervals (UL time intervals) during which data may be transmitted by the user apparatus. The DL time resources which are allocated for a user apparatus may comprise scheduled times for transmission of data to the user apparatus e.g., by a network apparatus. For example, the scheduled times for transmission of data to the user apparatus may comprise time intervals (DL time intervals) during which data may be transmitted to the user apparatus. Each time interval may have a start time. The start time may be provided using an accurate timing technique. For example, the start time may be provided as an absolute time using means such a GPS means. For example, the network apparatus may comprise a clock that is directly synced to a GPS satellite source that relays an absolute time e.g., based on UTC. The start time of an UL time interval k may be referred to as $$t_{0,k}^{UL}$$

and the start time of a DL time interval k may be referred to as $$t_{0,k}^{DL}.$$

The start time may be provided using a pre-defined frame/ slot/sub-slot structure or the network apparatus can broadcast such information.

The present subject matter may advantageously make use of the allocated resources for enabling time synchronization at apparatuses of the communication system. The time synchronization may be enabled by providing a common time base or time reference. This may enable coordinated activities like networked control loops or distributed sensing which may be typical for Industrial Internet of Things (IIoT) scenarios. For that, a network apparatus (NP1) may be provided. The network apparatus NP1 may, for example, be serving a set of N user apparatuses $UP_1 \ldots UP_N$ in the communication system. The network apparatus NP1 may be configured to transmit data (e.g., messages) using the time domain resources and a predefined frequency band. The predefined frequency band may be a contiguous section of radio spectrum frequencies. The predefined frequency band may be a licensed spectrum. The industrial frequency band may be assigned by a third-party service. The predefined frequency band may, for example, be an industrial frequency band. The industrial frequency band may, for example, be the n78 (Europe) or n79 (Asia) FR1 TDD frequency band for local industrial operation but it is not limited to.

The network apparatus NP1 may select a user apparatus $UP_s$, where s=1, ..., N, of the set of user apparatuses. This selected user apparatus $UP_s$ may have been allocated, e.g., by the network apparatus NP1, UL time intervals and DL time intervals. The network apparatus NP1 may select a scheduled transmission time for data transmission to the selected user apparatus $UP_s$. For example, the network apparatus NP1 may select one time interval k of the DL time intervals allocated for the user apparatus $UP_s$. This selected DL time interval k may have a start time $$t_{0,k}^{DL}.$$

The start time $$t_{0,k}^{DL}$$

may be the time at which the network apparatus NP1 may send data (or start sending data) to the selected user apparatus $UP_s$. The network apparatus NP1 may estimate a propagation time or propagation delay ($t_{prop}$) of a message to be transmitted from the network apparatus NP1 to the selected user apparatus $UP_s$. Such propagation time estimation may be based on the measurement results with or without involvement of the user apparatus. The propagation time $t_{prop}$ may, for example, refer to the time for the message to propagate over a link between the network apparatus NP1 and the selected user apparatus $UP_s$. In case the set of user apparatuses $UP_1 \ldots UP_N$ are served within a small area such as a factory area, the prorogation time $t_{prop}$ may be negligible and the propagation delays for the set of user apparatuses $UP_1 \ldots UP_N$ may be similar within a predefined accuracy range. Using the start time $$t_{0,k}^{DL}$$

of the selected DL time interval k and the estimated propagation time $t_{prop}$, the network apparatus NP1 may estimate an arrival time ($t_{target}$) of the message at the selected user apparatus $UP_s$. For example, the arrival time $t_{target}$ may be defined as the sum of the start time $$t_{0,k}^{DL}$$

and the propagation time $t_{prop}$ i.e., $$t_{target} = t_{0,k}^{DL} + t_{prop}.$$

The network apparatus NP1 may generate a message (MESS) that comprises the value of the estimated arrival time $t_{target}$ and may provide the message MESS. Thus, as described above, the network apparatus NP1 is configured to perform a method, named timing method, comprising the selection of the user apparatus, the selection of the scheduled transmission time, the estimation of the arrival time and the provision of the message MESS.

The message MESS may be short compared to the size of a resource (timeslot) and has highest priority (5Qi-class). Thus, such a message may not be split for transmission by the network apparatus NP1. For example, the message MESS may be generated such that the size of the message MESS may be sent at once as one signal by the network apparatus NP1 without a need to be split.

The message MESS may, for example, be a User-plane (U-plane) message (e.g., an ordinary payload). This may be advantageous because the message can be received and processed by any user apparatus without mandating any specific on-top feature at the user apparatus. The user apparatus may, for example, be a user equipment and the network apparatus NP1 may, for example, be a base station.

In one example, the timing method may automatically be performed by the network apparatus NP1. Alternatively, or additionally, the timing method may be performed by the network apparatus NP1 in response to receiving a request of arrival time e.g., from a user apparatus. In one example, the timing method may be repeated for the same selected user apparatus $UP_s$ e.g., on a periodic basis. The repetition may, for example, be performed until a stopping criterion is fulfilled. The stopping criterion may, for example, require that the selected user apparatus $UP_s$ is not served anymore (disconnected) by the network apparatus NP1 or that a maximum number of repetitions is reached or a distinct request to stop further transmissions of timing information is received from a user apparatus at the network apparatus NP1. Alternatively, or additionally, the timing method may be repeated, wherein in each repetition a distinct user apparatus of the set of user apparatuses $UP_1 \ldots UP_N$ is selected in order to receive the timing information.

In one first selection example, the network apparatus NP1 may select the user apparatus $UP_s$ randomly from the set of user apparatuses $UP_1 \ldots UP_N$. This may particularly be advantageous in case the timing method is performed for each user apparatus of the set of user apparatuses $UP_1 \ldots UP_N$.

In one second selection example, the selected user apparatus $UP_s$ may be the next (upcoming) user apparatus that is scheduled for receiving data from the network apparatus NP1. This may be advantageous as it may seamlessly integrate the present method with the existing scheduling techniques.

In one third selection example, the selected user apparatus $UP_s$ may be the user apparatus that has sent to the network apparatus NP1 a request of the arrival time.

In one fourth selection example, the network apparatus NP1 may determine a distance between the network apparatus NP1 and each user apparatus of the set of user apparatuses $UP_1 \ldots UP_N$. This may result in N computed distances $D_1 \ldots D_N$. The network apparatus NP1 may select the user apparatus $UP_s$ based on the determined distances $D_1 \ldots D_N$. For example, the selected user apparatus $UP_s$ may be the user apparatus having a largest distance of the distances $D_1 \ldots D_N$. This may be advantageous as the prorogation time of the selected user apparatus $UP_s$ may be the largest propagation time compared to the propagation times to the other user apparatuses. This may make sure that the arrival time used by each user apparatus of the set of user apparatuses is not underestimated. In another example, the selected user apparatus $UP_s$ may be the user apparatus having the median distance of the distances $D_1 \ldots D_N$. This may enable to have a balance between underestimated and overestimated arrival times at the set of user apparatuses.

In one fifth selection example, the network apparatus NP1 may identify in the set of user apparatuses $UP_1 \ldots UP_N$ one or more subgroups of user apparatuses, wherein each subgroup of apparatuses are associated with propagation delays which are similar within a predefined accuracy range. For example, each user apparatus $UP_i$ of the set of user apparatuses $UP_1 \ldots UP_N$ may be associated with a respective propagation delay $$t_{prop}^{UP_i}$$

which is the propagation time of a message from the network apparatus NP1 to the user apparatus $UP_i$, where $i=1, \ldots, N$. These propagation delays $$t_{prop}^{UP_1} \ldots t_{prop}^{UP_N}$$

associated with the set of user apparatuses $UP_1 \ldots UP_N$ respectively may be estimated by the network apparatus NP1. The network apparatus NP1 may compare the propagation delays $$t_{prop}^{UP_1} \ldots t_{prop}^{UP_N}$$

in order to identify each subgroup of user apparatuses e.g., M user apparatuses $UP_1 \ldots UP_M$, where $M \leq N$, such that for each distinct pair $(UP_k, UP_l)$ of user apparatuses of the subgroup, where $l, k=1, \ldots, M$ and $l \neq k$, the propagation times $$t_{prop}^{UP_k}$$

and $$t_{prop}^{UP_l}$$

are similar within a predefined accuracy range; that is, for example, $$\left| t_{prop}^{UP_k} - t_{prop}^{UP_l} \right| < \Delta t_{prop} \text{ where } \Delta t_{prop}$$

may be the upper limit of said accuracy range. The selected user apparatus $UP_s$ may be one selected user apparatus of a selected subgroup of the subgroups. In one example, the network apparatus may be configured to send the message MESS as a multicast message to the selected subgroup of user apparatuses.

The different user apparatus selection methods may advantageously be used by the present subject matter to provide the message MESS. For example, the network apparatus NP1 may provide the message MESS using different methods, herein named provision methods.

In one first example provision method, the network apparatus NP1 may send the message MESS to the selected user apparatus $UP_s$. Upon receiving the message MESS, the selected user apparatus $UP_s$ may, for example, set its system time to the received arrival time $t_{target}$. For example, an application (e.g., clock application) of the selected user apparatus $UP_s$ may use the received arrival time to set the system time at the selected user apparatus $UP_s$. This may enable to synchronize the selected user apparatus $UP_s$ with a reference time provided by the serving network apparatus NP1. The first example provision method may advantageously be performed in case the user apparatus $UP_s$ is selected according to the first selection example or second selection example or third selection example.

In one second example provision method, the network apparatus NP1 may broadcast the message MESS, e.g., without specifying any target user apparatus. This may enable to synchronize the set of user apparatuses $UP_1 \ldots UP_N$ and not only a single user apparatus. The arrival time may be provided as a common time base or time reference for all the set of user apparatuses $UP_1 \ldots UP_N$. This may save resources as it may provide a same message at once to all set of user apparatuses without having to execute the timing method separately for each user apparatus of the set of user apparatuses $UP_1 \ldots UP_N$. This second example provision method may particularly be advantageous in case the set of user apparatuses $UP_1 \ldots UP_N$ are served in a small area. This is because, the differences between the propagation times associated with the set of user apparatuses $UP_1 \ldots UP_N$ and the estimated propagation time $t_{target}$ may be small. Hence according to one example, the timing method, may be performed in case the geographical area of service (e.g., cell) of the network apparatus NP1 is smaller than a predefined maximum area e.g., the maximum area may be 100 m². This second example provision method may further particularly be advantageous in case the differences between the propagation times associated with the set of user apparatuses $UP_1 \ldots UP_N$ and the estimated propagation time $t_{target}$ are within the required time accuracy of an application being used at the set of user apparatuses. For example, if an application running on the set of user apparatuses $UP_1 \ldots UP_N$ is an image sharing application that shares images between the set of user apparatuses $UP_1 \ldots UP_N$ and the application requires a time accuracy of 10 ms (e.g., the images may need be displayed within 10 ms in all set of user apparatuses $UP_1 \ldots UP_N$), then if said propagation time differences are of the level of 100 micro seconds or 1 ms, they can still fulfill the requirement of the application. The second example provision method may advantageously be performed in case the user apparatus $UP_s$ is selected according to the fourth selection example.

In one third example provision method, the network apparatus NP1 may send the message MESS as a multicast message to the selected user apparatus $UP_s$ and to other user apparatuses. For example, the other user apparatuses may be the user apparatuses of the set of user apparatuses which are different from the selected user apparatus $UP_s$. Alternatively, the other user apparatuses and the selected user apparatus may be a subgroup of the set of user apparatuses $UP_1 \ldots UP_N$, wherein the subgroup of apparatuses have propagation delays which are similar within a predefined accuracy range.

The present subject matter may further improve the time accuracy of the provided arrival time. This may particularly be advantageous in case the time accuracy required by applications running on the user apparatuses may need real time interactions. For that, the network apparatus NP1 may estimate the processing time ($t_{proc}$) of the message at the selected user apparatus $UP_s$ and at the network apparatus NP1 and the arrival time may be defined as the sum of the start time $$t_{0,k}^{DL},$$

the propagation time $t_{prop}$ and the estimated processing time $t_{proc}$ i.e., $$t_{target} = t_{0,k}^{DL} + t_{prop} + t_{proc}.$$

The processing time may be the time required for performing the required operations on a message at a user apparatus and the network apparatus before being actually used by an application at the user apparatus. The processing time may be defined as the sum of the processing time of the message at the selected user apparatus $UP_s$ and the processing time of the message at the network apparatus $$NP1 : t_{proc} = t_{proc}^{UP_s} + t_{proc}^{NP1},$$

where $$t_{proc}^{UP_s}$$

is the processing time of the message at the selected user apparatus $UP_s$ and $$t_{proc}^{NP1}$$

is the processing time of the message at the network apparatus NP1. The processing time $$t_{proc}^{UP_s}$$

of the message at the selected user apparatus $UP_s$ may be the time elapsed between a reception time of the message at the selected user apparatus $UP_s$ and a time at which an application (e.g., clock application) of the selected user apparatus $UP_s$ starts the usage of the message (e.g., to set the system time of the selected user apparatus $UP_s$). The processing time $$t_{proc}^{NP1}$$

of the message at the network apparatus NP1 may be the time elapsed between the message generation end time and the time at which the message is sent out. For example, the processing time may comprise any on-top delay that may be caused on the 5GS and on the UE and is purely technology (5G) related, e.g., compute delay, coding delay, interleaving, etc. The 5GS may have access to knows these delay components and can thus adjust the target time.

The user apparatus may use the timing information of the received message to set the physical hardware (HW) clock at the network interface card (NIC) and/or set the system time at the user apparatus. Based on this, packets that will be conveyed through the user apparatus may be time stamped using the Physical Hardware Clock (PHC) time. In consumer devices, the (correct) system time may be used e.g., for collaborative gaming.

In one example, the set of user apparatuses $UP_1 \ldots UP_N$ may comprise one or more devices of a manufacturing automation system. The devices may, for example, comprise Programmable Logic Controllers (PLCs), Computerized Numerical Control (CNC) machines, distributed control system (DCS) devices or supervisory control and data acquisition (SCADA) devices. This may be advantageous as it may enable a seamless integration of manufacturing automation systems with wireless communication systems. In another example, the selected user apparatus $UP_s$ may be used to replace a wireline link in a manufacturing automation system. That is, instead of sending messages from a source of the manufacturing automation system through the wireline link to a target of the manufacturing automation system, the messages (comprising the timing information) may be sent from the source through the selected $UP_s$ and the communication system to the target. This may particularly be advantageous as the messages may be accurately stamped at the selected user apparatus $UP_s$ using the estimated arrival time.

Beneficially, the message MESS may be setup as an IP or UDP packet, preferably with the destination address of the selected user apparatus $UP_s$ and a specific port used for this timing service, or as an Ethernet frame in case the manufacturing automation system solely uses level 2 (L2) such as the L2 of a Transmission Control Protocol/Internet Protocol (TCP/IP) protocol.

In one example implementation, the network apparatus NP1 may be a base station and the set of user apparatuses may be user equipments (UEs) which are served by the base station. This may be advantageous as it may seamlessly be integrated within existing communication systems. In another example, the network apparatus NP1 may be a core network node of the wireless communication system. This may be advantageous as the adaptation of every base station with the present functionality may be prevented. In this case, the network apparatus NP1 may have access to the time and frequency resources which are allocated for the set of user apparatuses $UP_1 \ldots UP_N$ by other means such as a base station of the communication system.

The UL time intervals and the DL time intervals which are allocated for the set of user apparatuses $UP_1 \ldots UP_N$ in the communication system may have a pattern configuration. For example, the pattern configuration may be defined according to a TDD mode. According to the TDD mode, over the same frequency a set of different time slots may be allocated for uplink and downlink signals. The UL time intervals and the DL time intervals which are allocated for the set of user apparatuses $UP_1 \ldots UP_N$ may be these sets of time slots which are provided for different frequencies. For example, a frame structure may be provided. The frame structure may define a radio frame comprising multiple subframes, wherein each subframe has a respective System Frame Number (SFN). Each subframe may have an absolute start time $t_{SFN}$. Each subframe may comprise time slots, wherein each time slot is associated with a start time (or time offset) of the time slot $t_{slot}$ within the subframe. Following this frame structure, the selected DL time interval k may be one time slot of a given subframe. Thus, the start time of the selected time interval k may be defined as follows:

$$t_{0,k}^{DL} = t_{SFN} + t_{slot}.$$

The present subject matter may have, for example, the following advantages. The present subject matter may make a 5G commercial equipment (including a Core, RAN, and UE) applicable for manufacturing environments. The present subject matter may seamlessly be integrated and work with different 5G releases such as 5G release 15 or with 4G. The present subject matter may not mandate existence of time sensitive networks (TSN).

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 110 and 112. The devices 110 and 112 may, for example, be user devices. The devices 110 and 112 are configured to be in a wireless connection on one or more communication channels with a node 114. The node 114 is further connected to a core network 120. In one example, the node 114 may be an access node (such as (e/g)NodeB) 114 providing or serving devices in a cell. In one example, the node 114 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 120 (CN or next generation core NGC). For example, the (e/g)NodeB may connect to an access and mobility management function (AMF) and user plane function (UPF) in the control plane and user plane, respectively. Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called user device, UE, user equipment, user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g., to be used in smart power grids and connected vehicles. The device may also utilize cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than an existing LTE system (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet as illustrated by the component referenced by reference numeral 122, or utilize services provided by them. The communication network may also be able to support the usage of cloud services, for example at least part of core network operations may be carried out as a cloud service (this is depicted in FIG. 1 by "cloud" 124). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 114) and non-real time functions being carried out in a centralized manner (in a centralized unit, CU 118).

It should also be understood that the distribution of labour between core network operations and base station operations may differ from that of the LTE or even be non-existent. Some other technology advancements probably to be used are Big Data and all-IP, which may change the way networks are being constructed and managed. 5G is being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 116 in the mega-constellation may cover several satellite-enabled network entities that create on-ground cells. The on-ground cells may be created via an on-ground relay node 114 or by a gNB located on-ground or in a satellite.

It is understandable for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. One of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
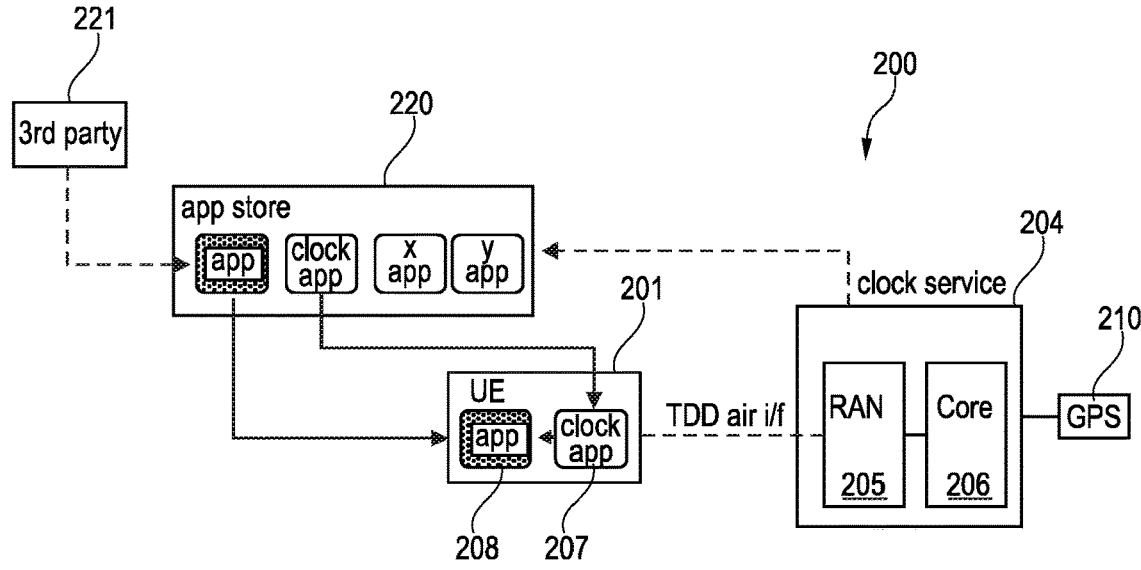
FIG. 2 is a schematic illustration of a wireless communication system.

FIG. 2 is a schematic illustration of a wireless communication system 200. The communication system 200 may be configured to use a time division duplex (TDD) technique for data transmission. The communication system 200 may, for example, be a 5G system.

For simplicity, communication system 200 is shown to include a user equipment 201 and a radio network system 204. The user equipment 201 may be one of a set of user equipments which are served in the communication system 200. The radio network system 204 comprises a radio access network (RAN) 205 and a core network 206. The radio network system 204 may be synchronized via a GPS 210. For example, the communication system 200 may enable an end-to-end communication system with a TDD based air-interface between the user equipment 201 and the radio network system 204.

In this particular example, the user equipment 201 may comprise a clock application 207 and a user application 208. The clock application 207 and the user application 208 may, for example, be downloaded (e.g., by a user of the user equipment 201) from an application store 220. The clock application 207 may, for example, be provided by a system administrator of the communication system 200. The user application 208 may be provided by a third-party service 221. The clock application 207 may be configured to receive and process messages from the radio network system 204 in order to perform time synchronization. The user application 208 may harvest the accurate timing capability. The user application 208 may, for example, be a gaming app (which can rely on time synchronicity between mobile players using the present subject matter), a drone app etc.

The radio network system 204 may have the exact time as it is synched via GPS 210. The radio network system 204 may implement extensions that take into account the time behavior of the user equipment 201 and act such that the user equipment 201 is provided with the exact time. For example, a base station of the radio network system 204 may be aware of all timing constrains of all connected UEs including the UE 201. This may enable the base station to send information to the UE such that the UE 201 may get the exact time—without the UE 201 doing anything specific for it.

The set of user equipments of the communication system 200 may be allocated resources in time domain. The allocation of the resources in time domain may, for example, be performed in accordance with a TDD technique.

Figure 3:
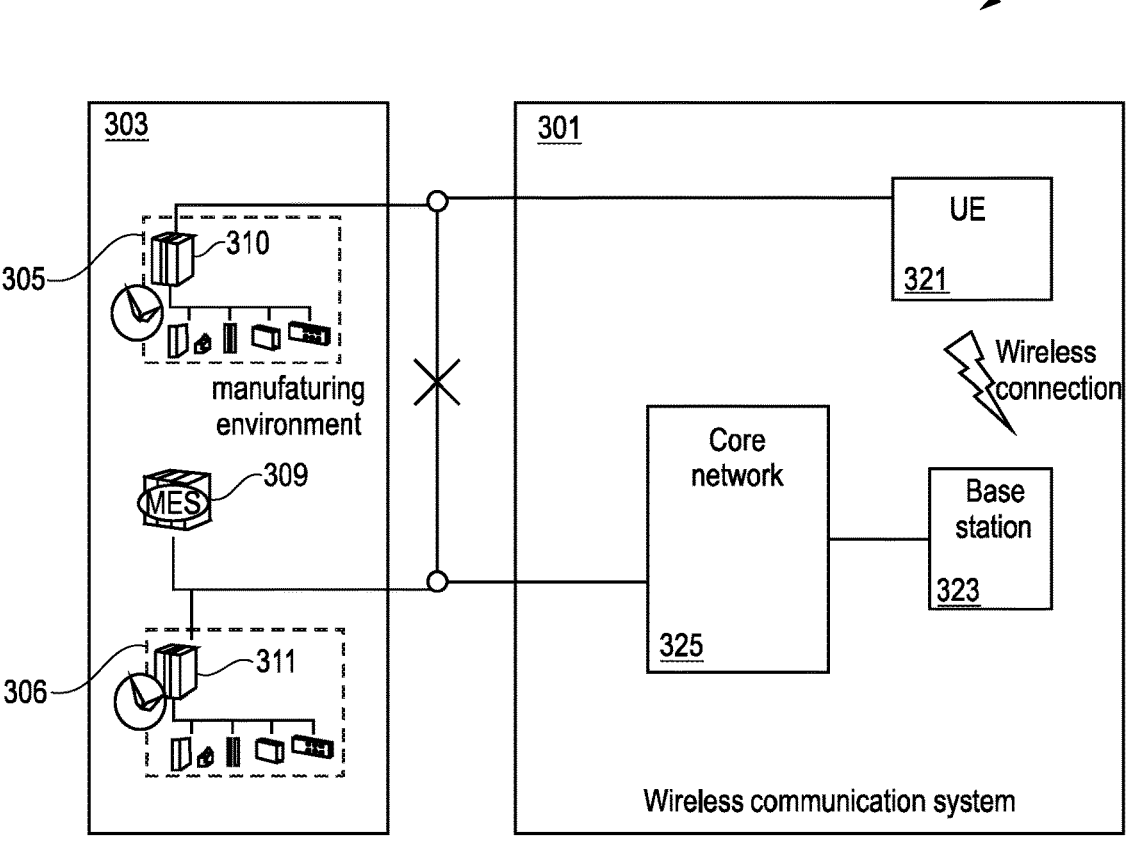
FIG. 3 is a schematic illustration of an automation manufacturing system according to an example of the present subject matter.

FIG. 3 is a schematic illustration of an automation manufacturing system 300. The automation manufacturing system 300 may comprise a wireless communication system 301 and a manufacturing environment 303 such as IIoT environment.

The manufacturing environment 303 comprises multiple production cells 305 and 306. For simplification of the drawings, only two productions cells are shown, but it is not limited to. As illustrated in FIG. 3, within each production cell (which in many cases may be within a machine) nodes are connected via a field bus. The communication protocol that is used in the field bus may, for example, be EtherCAT or time sensitive network (TSN).

The production cells 305-306 may communicate with a Manufacturing Execution System (MES) 309 vial Program Line Controls (PLCs) 310 and 311 respectively. The communication may, for example, be performed through links using an IP protocol such as Ethernet/IP or OPC UA. The manufacturing environment 303 may enable time synchronization (indicated as clock in FIG. 3) so that a clock synchronicity is provided at each affected node (e.g., PLC or MES).

The present subject matter may enable to replace a wireline link from a PLC to the MES by a wireless connection. This is illustrated in FIG. 3, where the wireline link between the PLC 310 and the MES 309 is replaced by a wireless connection. The communication system 301 may enable the wireless connection. For example, the PLC 310 may be configured to connect to and communicate with a user equipment 321 of the communication system 301. The user equipment 321 may be served by base station 323 of the communication system 301. The communication system 301 further comprises a core network 325. The core network 325 may be configured to connect to the MES 309. Thus, instated of sending messages from the PLC 310 through the wireline link to the MES 309, the messages may be sent from the PLC 310 through the UE 321 and the communication system 301 to the MES 309.

For simplicity of the description only one user equipment 321 is shown. This user equipment 321 may be one of a set user equipments which are served in the communication system 301. The set of user equipments of the communication system 301 may be allocated resources in time domain. The allocation of the resources in time domain may, for example, be performed in accordance with a TDD technique.

The present subject matter may have the benefit that time synchronization may be introduced to an industry environment on the fly, even without demanding the availability of PTP servers or clients. For example, each IIoT device connected to a 5G system may have the correct system time (e.g., the clock at the IIoT device is set by the app) and any industry application may build on the system time available at the UE.

Figure 4:
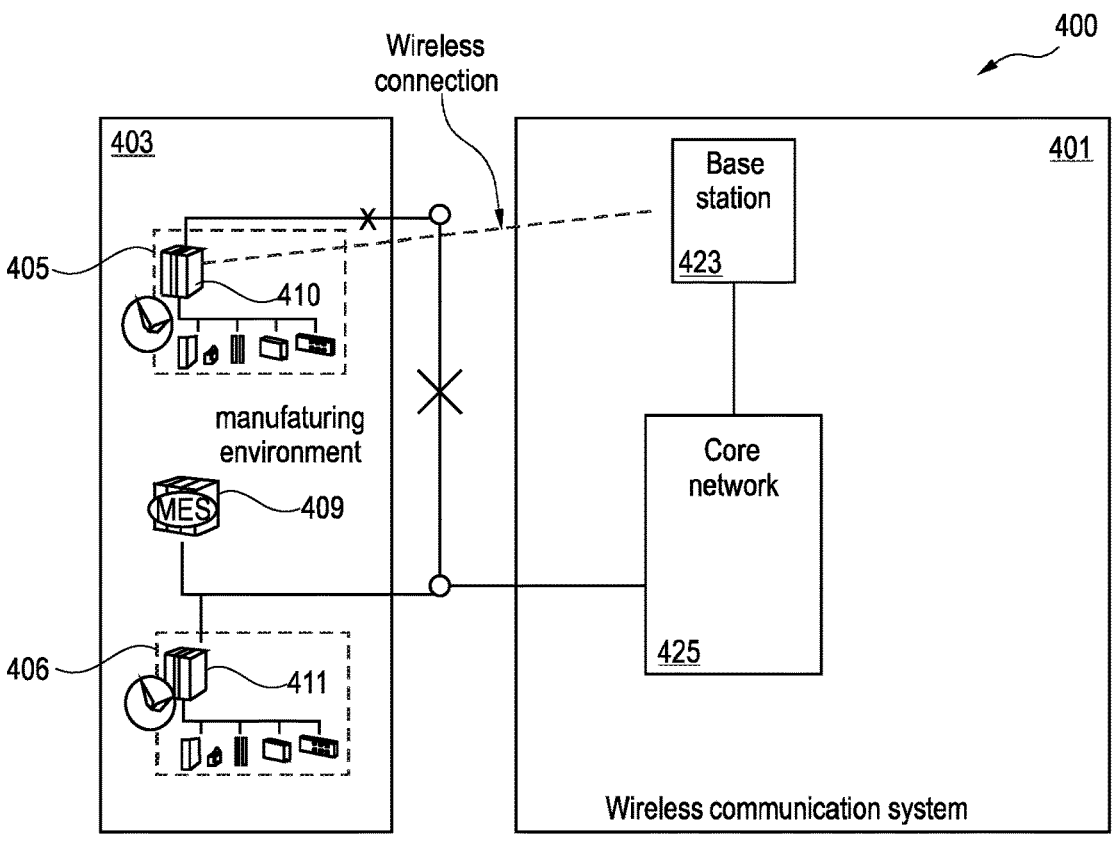
FIG. 4 is a schematic illustration of an automation manufacturing system according to an example of the present subject matter.

FIG. 4 is a schematic illustration of an automation manufacturing system 400. The automation manufacturing system 400 may comprise a wireless communication system 401 and a manufacturing environment 403.

The manufacturing environment 403 comprises multiple production cells 405 and 406. For simplification of the drawings, only two productions cells are shown, but it is not limited to. As illustrated in FIG. 4, within each production cell (which in many cases may be within a machine) nodes are connected via a field bus. The communication protocol that is used in the field bus may, for example, be EtherCAT (US, Acia Pacific) or time sensitive network (TSN).

The production cells 405-406 may communicate with a Manufacturing Execution System (MES) 409 vial Program Line Controls (PLCs) 410 and 411 respectively. The communication may, for example, be performed through links using an IP protocol such as Ethernet/IP or OPC UA. The manufacturing environment 403 may enable time synchronization (indicated as clock in FIG. 4) so that a clock synchronicity is provided at each affected node (e.g., PLC or MES).

The present subject matter may enable to replace a wireline link from a PLC to the MES by a wireless connection. This is illustrated in FIG. 4, where the wireline link between the PLC 410 and the MES 409 is replaced by a wireless connection by providing the PLC 410 as a user equipment of the communication system 401. The communication system 401 may enable the wireless connection. For example, the PLC 410 may be configured to be served by base station 423 of the communication system 401. The communication system 401 further comprises a core network 425. The core network 425 may be configured to connect to the MES 409. Thus, instated of sending messages from the PLC 410 through the wireline link to the MES 309, the messages may be sent from the PLC 410 through the base station 423 and the core network 425 to the MES 409.

For simplicity of the description only one PLC 410 is described having a UE capability, However, other PLCs of the manufacturing environment 403 may also use wireless communication through the communication system 401.

Figure 5:
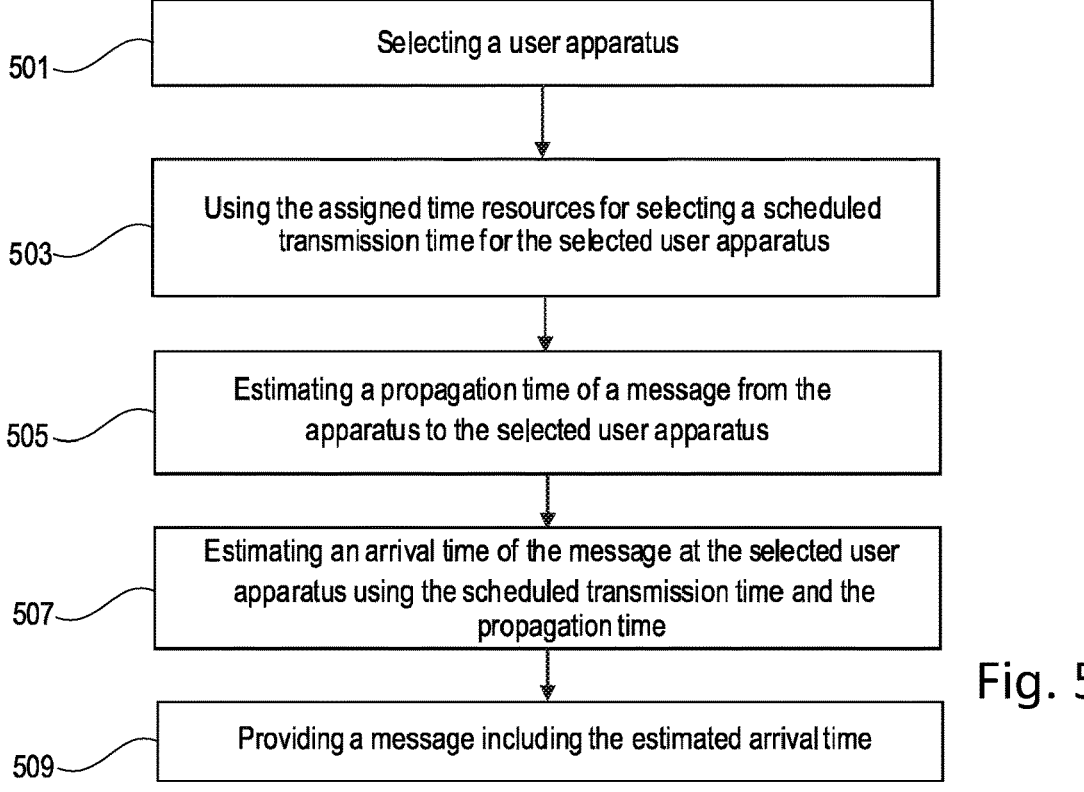
FIG. 5 is a flowchart of a method for providing timing information according to an example of the present subject matter.

FIG. 5 is a flowchart of a method according to an example of the present subject matter. For the purpose of explanation, the method described in FIG. 5 may be implemented in the system illustrated in FIG. 1, FIG. 2, FIG. 3 or FIG. 4, but is not limited to this implementation. The method may, for example, be performed by a network apparatus such as a core network node 206 or node 114 or base station 323 or base station 423 but it is not limited to as the skilled person may apply the present matter to another element of the communication system provided with necessary properties.

The method starts at step 501, where the network apparatus may select a user apparatus of a set of user apparatuses. The set of user apparatuses may, for example, be UEs which are served by the network apparatus.

The network apparatus may use the time domain resources allocated for the selected user apparatus in order to select in step 503 a scheduled time for data transmission to the selected user apparatus.

The network apparatus may estimate in step 505 a propagation time of a message to be transmitted from the network apparatus to the selected user apparatus. The propagation time may be the time lapsed from the time at which the submission of the message has started to the time at which the reception of the message is completed at the selected user apparatus.

The network apparatus may estimate in step 507 an arrival time of the message at the selected user apparatus using the scheduled transmission time and the propagation time.

The network apparatus may provide in step 509 a message including the estimated arrival time. The message may be provided in step 509 according to the scheduled transmission time which is selected in step 503. The network apparatus may build a message that includes the value of the estimated arrival time. Said built message may be provided in step 509. The present subject matter may provide different implementations of step 509 as described with reference to FIGS. 6 and 7.

The method of FIG. 5 may, for example, be automatically performed. Alternatively, method of FIG. 5 may be performed upon receiving a request (e.g., of timing information) at the network apparatus.

FIG. 6 is a flowchart of a method according to an example of the present subject matter. For the purpose of explanation, the method described in FIG. 6 may be implemented in the system illustrated in FIG. 1, FIG. 2, FIG. 3 or FIG. 4, but is not limited to this implementation. The method may, for example, be performed by a network apparatus such as a core network node 206 or node 114 or base station 323 or base station 423 but it is not limited to as the skilled person may apply the present matter to another element of the communication system provided with necessary properties.

The method starts at step 601, where the network apparatus may select a user apparatus of a set of user apparatuses. The set of user apparatuses may, for example, be UEs which are served by the network apparatus.

The network apparatus may use the time domain resources allocated for the selected user apparatus in order to select in step 603 a scheduled time for data transmission to the selected user apparatus.

The network apparatus may estimate in step 605 a propagation time of a message to be transmitted from the network apparatus to the selected user apparatus.

The network apparatus may estimate in step 607 an arrival time of the message at the selected user apparatus using the scheduled transmission time and the propagation time.

The network apparatus may send in step 609 a message including the estimated arrival time to the selected user apparatus. The message may be sent in step 609 at the scheduled transmission time which is selected in step 603.

FIG. 7 is a flowchart of a method according to an example of the present subject matter. For the purpose of explanation, the method described in FIG. 7 may be implemented in the system illustrated in FIG. 1, FIG. 2, FIG. 3 or FIG. 4, but is not limited to this implementation. The method may, for example, be performed by a network apparatus such as a core network node 206 or node 114 or base station 323 or base station 423 but it is not limited to as the skilled person may apply the present matter to another element of the communication system provided with necessary properties.

The method starts at step 701, where the network apparatus may select a user apparatus of a set of user apparatuses. The set of user apparatuses may, for example, be UEs which are served by the network apparatus.

The network apparatus may use the time domain resources allocated for the selected user apparatus in order to select in step 703 a scheduled time for data transmission to the selected user apparatus.

The network apparatus may estimate in step 705 a propagation time of a message to be transmitted from the network apparatus to the selected user apparatus.

The network apparatus may estimate in step 707 an arrival time of the message at the selected user apparatus using the scheduled transmission time and the propagation time.

The network apparatus may broadcast in step 709 a message including the estimated arrival time. The message may be broadcast in step 709 according to the scheduled transmission time which is selected in step 703.

Figures 8, 9:
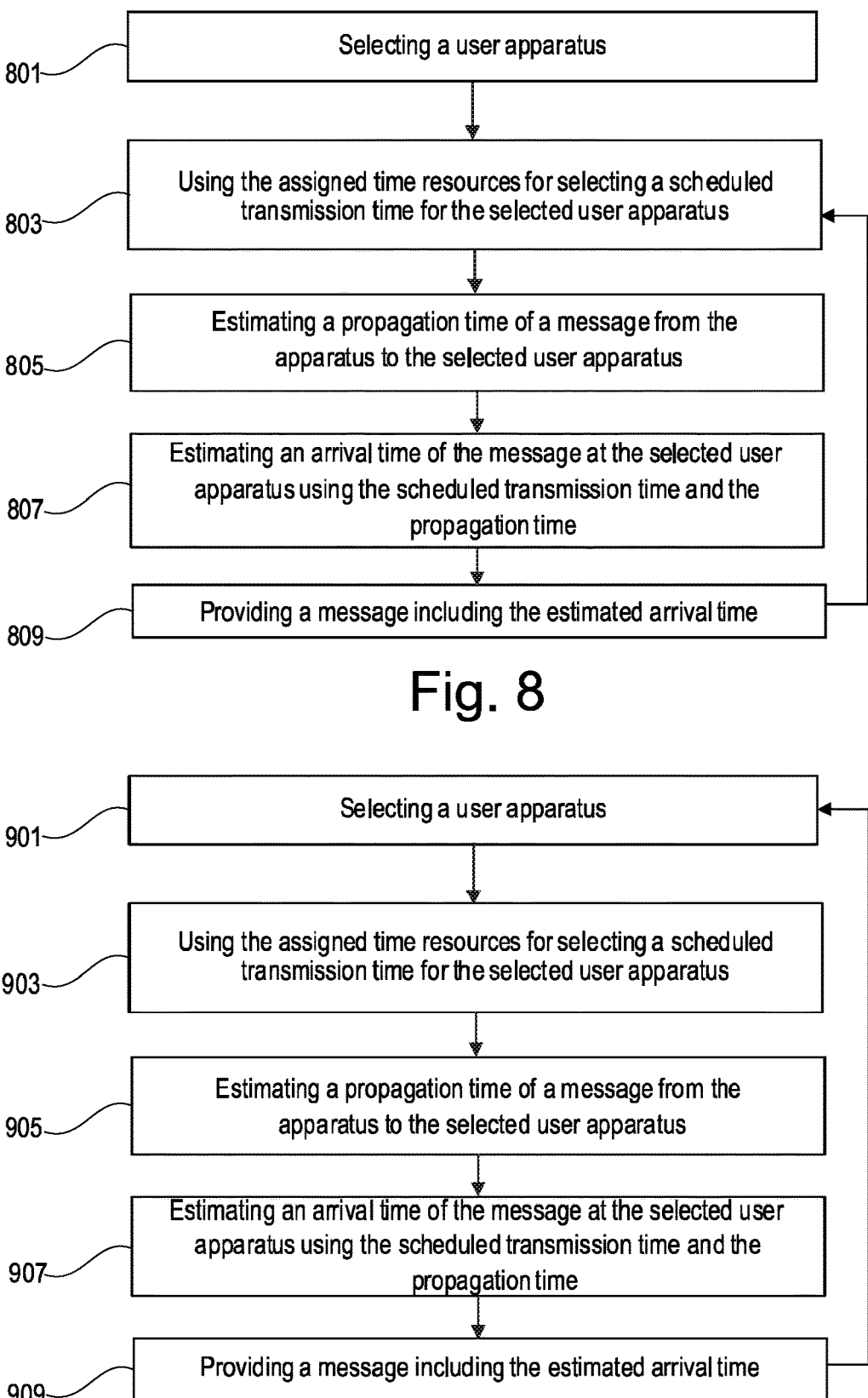
FIG. 8 is a flowchart of a method for providing timing information according to an example of the present subject matter.
FIG. 9 is a flowchart of a method for providing timing information according to an example of the present subject matter.

FIG. 8 is a flowchart of a method according to an example of the present subject matter. For the purpose of explanation, the method described in FIG. 8 may be implemented in the system illustrated in FIG. 1, FIG. 2, FIG. 3 or FIG. 4, but is not limited to this implementation. The method may, for example, be performed by a network apparatus such as a core network node 206 or node 114 or base station 323 or base station 423 but it is not limited to as the skilled person may apply the present matter to another element of the communication system provided with necessary properties.

The method starts at step 801, where the network apparatus may select a user apparatus of a set of user apparatuses. The set of user apparatuses may, for example, be UEs which are served by the network apparatus.

The network apparatus may use the time domain resources allocated for the selected user apparatus in order to select in step 803 a scheduled time for data transmission to the selected user apparatus.

The network apparatus may estimate in step 805 a propagation time of a message to be transmitted from the network apparatus to the selected user apparatus.

The network apparatus may estimate in step 807 an arrival time of the message at the selected user apparatus using the scheduled transmission time and the propagation time.

The network apparatus may provide (e.g., broadcast) in step 809 a message including the estimated arrival time.

As indicated in FIG. 8, steps 803 to 809 may be repeated for the same selected user apparatus. The repetition may, for example, be performed on a periodic basis e.g., every day. The repetition may, for example, be performed until a stopping criterion is fulfilled. The stopping criterion may, for example, require that the selected user apparatus is not served anymore (disconnected) by the network apparatus or that a maximum number of repetitions is reached or upon receiving a stopping request e.g., from the selected user apparatus.

FIG. 9 is a flowchart of a method according to an example of the present subject matter. For the purpose of explanation, the method described in FIG. 9 may be implemented in the system illustrated in FIG. 1, FIG. 2, FIG. 3 or FIG. 4, but is not limited to this implementation. The method may, for example, be performed by a network apparatus such as a core network node 206 or node 114 or base station 323 or base station 423 but it is not limited to as the skilled person may apply the present matter to another element of the communication system provided with necessary properties.

The method starts at step 901, where the network apparatus may select a user apparatus of a set of user apparatuses. The set of user apparatuses may, for example, be UEs which are served by the network apparatus.

The network apparatus may use the time domain resources allocated for the selected user apparatus in order to select in step 903 a scheduled time for data transmission to the selected user apparatus.

The network apparatus may estimate in step 905 a propagation time of a message to be transmitted from the network apparatus to the selected user apparatus.

The network apparatus may estimate in step 907 an arrival time of the message at the selected user apparatus using the scheduled transmission time and the propagation time.

The network apparatus may provide (e.g., broadcast) in step 909 a message including the estimated arrival time.

As indicated in FIG. 9, steps 901 to 909 may be repeated wherein in each repetition a user apparatus that has not been selected may be selected. The repetition may, for example, be performed until all the user apparatuses have been selected or upon receiving a stopping request e.g., from one of the selected user apparatuses.

FIG. 10 is a flowchart of a method for estimating an arrival time of a message according to an example of the present subject matter. For the purpose of explanation, the method described in FIG. 10 may be implemented in the system illustrated in FIG. 1, FIG. 2, FIG. 3 or FIG. 4, but is not limited to this implementation. The method may, for example, be performed by a network apparatus such as a core network node 206 or node 114 or base station 323 or base station 423 but it is not limited to as the skilled person may apply the present matter to another element of the communication system provided with necessary properties.

The network apparatus may determine in step 1001 a scheduled transmission time for a selected user apparatus. The selected user apparatus may, for example, be a user equipment that is being served by the network apparatus.

The selected user apparatus may, for example, be allocated time domain resources. The time domain resources may be provided according to TDD. The time domain resources may, for example, be provided as time frames, each comprising subframes. FIG. 11 shows an example subframe 1010 that is allocated for the selected user apparatus. The subframe 1010 comprises a time slot pattern of DL and UL time slots. Specifically, FIG. 11 shows a subframe structure for FR1 band 78 which uses a 1-4 (UL:DL ration) pattern (e.g. in average four times the resources are employed for downlink transmission than for UL transmission). FIG. 11 shows a subframe of a TDD structure comprising 20 time slots of 0.5 ms length, numbered 0 to 19. Most of the time slots are assigned for downlink data transmission (DL), e.g., from a base station to the selected UE. Four slots are used for uplink (UL) and two are used for guard time/signaling. Note that there are eight subframes, each subframe may have a slightly different assignment signaling slots (not shown), and the scheme will be repeated every eight subframes.

As can be seen, the network apparatus may wait for a suitable downlink slot for data transmission which results in it has to wait 0 ms if it uses the first slot (slot 0) and 9.5 ms if it uses the last slot of the subframe (slot 19). Which slot can be used may depend on the correlation between the time when an application starts sending an information element (in downlink direction) and the pattern of the air interface. Since the network apparatus has knowledge on how the TDD pattern is configured and since it has the correct absolute time (it is GPS synchronized), it can place and send correct timing information. For example, the network apparatus may select or determine that the seventh time slot (slot 6 of subframe 0) may be used to transmit a message to the selected user apparatus. The time gap between slot 6 and the start of this subframe 1010 is 3 ms. The network apparatus may determine the accurate time when the subframe SFN 0 slot 0 started ($t_{SFN}$) as well as the time gap of slot 6 $t_{slot}$ ($t_{slot}$=3 ms). The start time $t_{slot}$ (or time gap) of the seventh time slot in combination with the start time $t_{SFN}$ of the subframe may define the scheduled transmission time. For example, the scheduled transmission time may be the sum of $t_{slot}$ and $t_{SFN}$ as indicated in FIG. 11.

The network apparatus may estimate in step 1003 a propagation time $t_{prop}$ of a message to be transmitted from the network apparatus to the selected user apparatus. For example, using measurement reports, the network apparatus may determine the propagation delay $t_{prop}$ in downlink (which may be neglectable for distances within a factory hall). Alternatively, the propagation time $t_{prop}$ may be derived based on timing advance command (e.g., ½ of Timing Advance (TA) corresponds to the one-way propagation delay). As another alternative example, the propagation time $t_{prop}$ may be derived based on the signaling exchange between the network apparatus and the selected user apparatus.

The network apparatus may estimate in step 1005 a [radio] technology dependent processing or coding time $t_{proc}$ of the message at said network apparatus and at the selected user apparatus. Alternatively, the selected user apparatus may report the processing time at the selected user apparatus e.g., as part of the UE capability.

The network apparatus may estimate in step 1007 an arrival time of the message at the selected user apparatus using the scheduled transmission time, the propagation time and the processing time. For example, a shown in FIG. 11, the arrival time may be estimated as the sum of these times: $t_{target}=t_{SFN}+t_{slot}+t_{prop}+t_{proc}$. Thus, the network apparatus may distinguish exactly (~μs) when the user apparatus will receive a message that was sent in a given time slot. Therefore, the timing information sent to the selected user apparatus may comprise the predicted time of arrival $t_{target}$ at the selected user apparatus.

Figure 12:
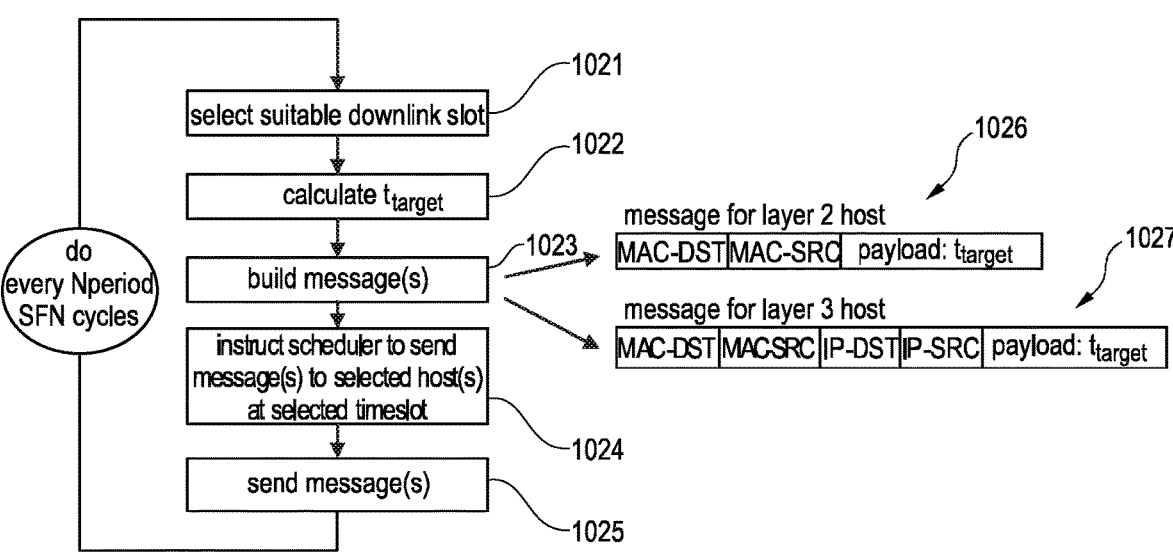
FIG. 12 is a flowchart of a method for providing timing information according to an example of the present subject matter.

FIG. 12 is a flowchart of a method according to an example of the present subject matter. For the purpose of explanation, the method described in FIG. 12 may be implemented in the system illustrated in FIG. 1, FIG. 2, FIG. 3 or FIG. 4, but is not limited to this implementation. The method may, for example, be performed by a network apparatus such as a core network node 206 or node 114 or base station 323 or base station 423 but it is not limited to as the skilled person may apply the present matter to another element of the communication system provided with necessary properties.

The network apparatus may select in step 1021 a downlink slot. Using the downlink slot, the network apparatus may calculate in step 1022 the arrival time $t_{target}$, e.g., as described with reference to FIG. 10. The network apparatus may build in step 1023 a message comprising the calculated arrival time $t_{target}$. The built message may be provided as shown in FIG. 12 as a message 1026 for layer 2 host or as a message 1027 for layer 3 host or any host receiving messages above L3 (not shown). The later may be advantageous as most consumer applications such as web applications may be built on HTTP. The network apparatus may instruct in step 1024 a scheduler of the network apparatus to send the message to a selected host at the selected downlink slot. The scheduler may send the message in step 1025. As indicated in FIG. 12, the steps 1021 to 1025 may be repeated. For example, the method of FIG. 12 may be repeated every number ($N_{period}$) of SFN cycles.

In one example implementation, the method of FIG. 12 may be performed at the RAN side. Repetitively, a gNB may select a slot (could be a fixed position, e.g., every 10th SFN 0 slot 6), calculate $t_{target}$ and build a message comprising this information. Beneficially, the message may be setup as an IP or User Datagram Protocol (UDP) packet, preferably with the destination address of the target UE and a specific port used for this timing service, or as an Ethernet frame in case the automation manufacturing system solely uses L2. Upon reception, the UE has been provided with the correct time, however, without requiring any specific functionality at the UE. In other words, the correct timing information may be foisted to the UE as an ordinary U-plane message (instead of a C-plane message requiring C-plane interworking).

Figure 13:
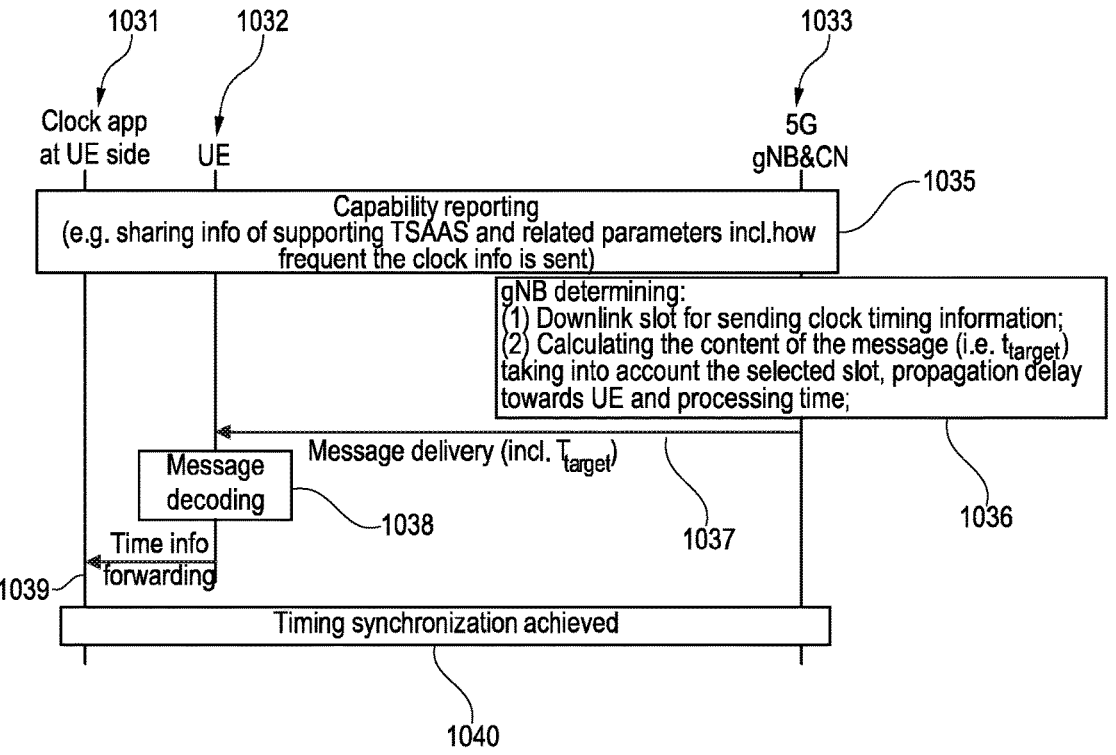
FIG. 13 is a flowchart of a method for timing synchronization according to an example of the present subject matter.

FIG. 13 is a signaling diagram for a method for timing synchronization according to an example of the present subject matter. For the purpose of explanation, the method described in FIG. 13 may be implemented in the system illustrated in FIG. 1, FIG. 2, FIG. 3 or FIG. 4, but is not limited to this implementation.

In step 1035, capability information of a UE 1032 may be shared between the UE 1032 and a 5G system comprising a gNB 1033 and a core network. In particular, a clock application 1031 and the 5GS may negotiate on capabilities and agree on parameters such as how frequent the synch-message (e.g., message MESS) shall be sent. As shown in FIG. 13, information of supporting Time and Synchronization as a Service (TSAAS) may be shared.

The gNB 1033 may determine in step 1036 a downlink slot for sending clock timing information and calculate an arrival time $t_{target}$ e.g., as described with reference to FIG. 10. The gNB 1033 may send (1037) to the UE 1032 the message including the arrival time $t_{target}$. The UE 1038 may decode in step 1038 the received message and may forward in step 1039 the timing information $t_{target}$ to the clock application 1031 of the UE 1032. This may enable time synchronization between the UE 1032 and the gNB 1033 in step 1040.

FIG. 14 is a flowchart of a method for time synchronization according to an example of the present subject matter. For the purpose of explanation, the method described in FIG. 14 may be implemented in the system illustrated in FIG. 1, FIG. 2, FIG. 3 or FIG. 4, but is not limited to this implementation. The method may, for example, be performed by a user apparatus such as a UE 110 or UE 201 or UE 321 or PLC 410 but it is not limited to as the skilled person may apply the present matter to another element of the communication system provided with necessary properties.

The user apparatus may receive in step 1041 a message from another apparatus (such as the base station 323 or 423) a message comprising an arrival time of the message at the user apparatus. The user apparatus may set in step 1043 a system time of the user apparatus according to the arrival time.

FIG. 15 is a flowchart of a method according to an example of the present subject matter. For the purpose of explanation, the method described in FIG. 15 may be implemented in the system illustrated in FIG. 1, FIG. 2, FIG. 3 or FIG. 4, but is not limited to this implementation. The method may, for example, be performed by a network apparatus such as a core network node 206 or node 114 or base station 323 or base station 423 but it is not limited to as the skilled person may apply the present matter to another element of the communication system provided with necessary properties.

The method starts at step 1051, where the network apparatus may select a subgroup of apparatuses of a set of user apparatuses. The set of user apparatuses may, for example, be UEs which are served by the network apparatus. For example, each user apparatus $UP_i$ of the set of user apparatuses may be associated with a respective propagation delay $$t_{prop}^{UP_i}$$

which is the propagation time of a message from the network apparatus NP1 to the user apparatus $UP_1$, where i=1, . . . , N, the number of user apparatuses. These propagation delays $$t_{prop}^{UP_1} \ldots t_{prop}^{UP_N}$$

associated with the set of user apparatuses respectively may be estimated by the network apparatus. The network apparatus may compare the propagation delays $$t_{prop}^{UP_1} \ldots t_{prop}^{UP_N}$$

in order to identify each subgroup of user apparatuses e.g., M user apparatuses $UP_1 \ldots UP_M$, where M≤N, such that for each distinct pair $(UP_k, UP_l)$ of user apparatuses of the subgroup, where l, k=1, . . . , M and l≠k, the propagation times $$t_{prop}^{UP_k} \text{ and } t_{prop}^{UP_t}$$

are similar within a predefined accuracy range; that is, for example, $$\left| t_{prop}^{UP_k} - t_{prop}^{UP_t} \right| < \Delta t_{prop}$$

where $\Delta t_{prop}$ may be the upper limit of said accuracy range

The network apparatus may select in step 1052 a user apparatus of the one or more subgroups of apparatuses. For example, if more than one subgroup is identified, one subgroup may be selected (e.g., randomly) from the subgroups by the network apparatus, and the network apparatus may select said user apparatus from the selected subgroup.

The network apparatus may use the time domain resources allocated for the selected user apparatus in order to select in step 1053 a scheduled time for data transmission to the selected user apparatus.

The network apparatus may estimate in step 1055 a propagation time of a message to be transmitted from the network apparatus to the selected user apparatus. For example, the network apparatus may use the previously estimated propagation delay $$t_{prop}^{UP_1} \ldots t_{prop}^{UP_N}$$

in step 1051 for said selected user apparatus. Alternatively, the network apparatus may estimate anew in step 1055 the propagation time for the selected user apparatus. This may provide an accurate estimation as the user apparatus may have been moved during the execution period between steps 1051 and 1055.

The network apparatus may estimate in step 1057 an arrival time of the message at the selected user apparatus using the scheduled transmission time and the propagation time.

The network apparatus may send in step 1059 a multicast message including the estimated arrival time to the selected subgroup of user apparatuses.

Figure 16:
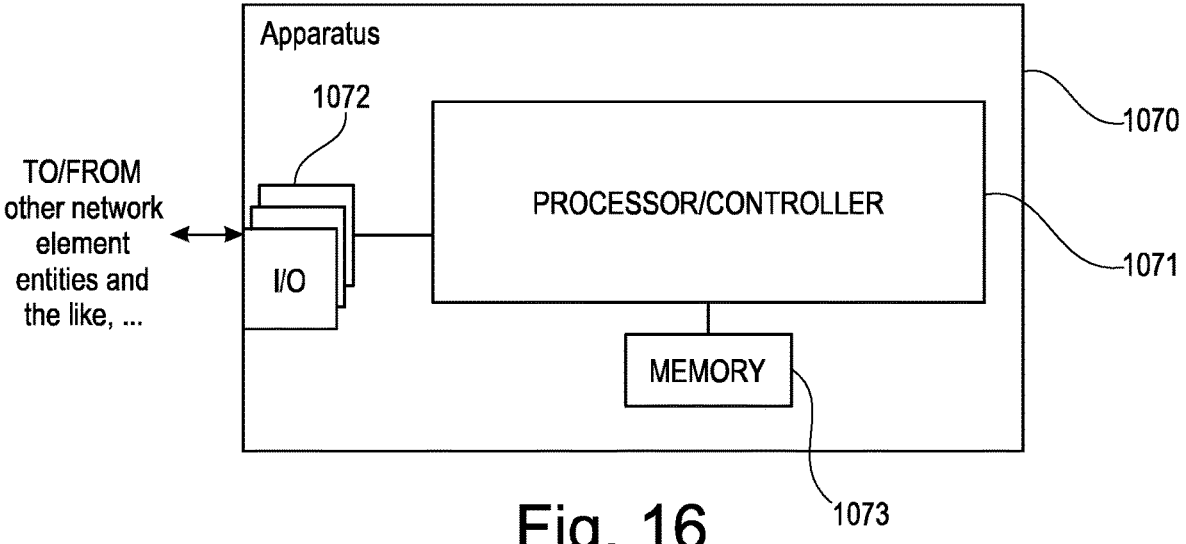
FIG. 16 is a block diagram showing an example of an apparatus according to an example of the present subject matter.

In FIG. 16, a block circuit diagram illustrating a configuration of an apparatus 1070 is shown, which is configured to implement at least part of the present subject matter. It is to be noted that the apparatus 1070 shown in FIG. 16 may comprise several further elements or functions besides those described herein below, which are omitted herein for the sake of simplicity as they are not essential for the understanding. Furthermore, the apparatus may be also another device having a similar function, such as a chipset, a chip, a module etc., which can also be part of an apparatus or attached as a separate element to the apparatus 1070, or the like. The apparatus 1070 may comprise a processing function or processor 1071, such as a central processing unit (CPU) or the like, which executes instructions given by programs or the like related to a flow control mechanism. The processor 1071 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 1072 denotes transceiver or input/output (I/O) units (interfaces) connected to the processor 1071. The I/O units 1072 may be used for communicating with one or more other network elements, entities, terminals or the like. The I/O units 1072 may be a combined unit comprising communication equipment towards several network elements or may comprise a distributed structure with a plurality of different interfaces for different network elements. Reference sign 1073 denotes a memory usable, for example, for storing data and programs to be executed by the processor 1071 and/or as a working storage of the processor 1071.

The processor 1071 is configured to execute processing related to the above described subject matter. In particular, the apparatus 1070 may be configured to perform the method as described in connection with FIG. 5, 6, 7, 8, 9, 10, 12 or 13.

For example, the processor 1071 is configured for: selecting a user apparatus of a set of user apparatuses; using resources allocated for the set of user apparatuses for selecting a scheduled transmission time for the selected user apparatus; estimating a propagation time of the message from the apparatus to the selected user apparatus; estimating an arrival time of the message at the selected user apparatus using the scheduled transmission time and the propagation time; providing according to the scheduled transmission time a message including the estimated arrival time.

Alternatively, the processor 1071 is configured for: receiving a message from another apparatus, the message comprising an arrival time of the message at the user apparatus; setting a system time of the user apparatus according to the arrival time.

The present subject matter may comprise the following clauses.

Clause 1. An apparatus comprising: at least one processor; and at least one memory storing instructions that, when executed by the at least one processor, cause the apparatus at least to perform: A) selecting a user apparatus of the set of user apparatuses; using the allocated resources for selecting a scheduled transmission time for the selected user apparatus; B) estimating a propagation time of a message from the apparatus to the selected user apparatus; C) estimating an arrival time of the message at the selected user apparatus using the scheduled transmission time and the propagation time; D) providing according to the scheduled transmission time a message including the estimated arrival time.

Clause 2. The apparatus of clause 2, the message being a user-plane message.

Clause 3. The apparatus of any of the preceding clauses 1 to 2, the apparatus being a base station and the set of user apparatuses being user equipments.

The set of user equipments may, for example, be served by the base station within an area covered by the base station.

Clause 4. The apparatus of clause 3, wherein the area has a surface which is smaller than a predefined maximum surface. The maximum surface may, for example, be a typical factory surface.

Clause 5. The apparatus of any of the preceding clauses 1 to 4, the generating of the message is performed such that the size of the message is smaller than a maximum size. The maximum size may be the size that can be transmitted by the network apparatus in a single message.

Clause 6. The apparatus of any of the preceding clauses 1 to 5, the selection of the user apparatus comprises: selecting a subgroup of apparatuses of the set of user apparatuses, wherein the subgroup of apparatuses are associated with prorogation delays which are within a predefined accuracy level; and selecting the user apparatus from the subgroup, wherein the providing of the message comprises sending the message as a multicast message to the subgroup of apparatuses.

Clause 7. The apparatus of any of the preceding clauses 1 to 6, the means being configured for estimating the propagation using a signaling exchange between the network apparatus and the selected user apparatus.

Clause 8. The apparatus of any of the preceding clauses 1 to 7, wherein the means are configured for estimating the arrival time by further using an estimated processing time of the message at the selected user apparatus and the apparatus. the processing time may be the sum of the processing time of the message at the selected user apparatus and the processing time of the message at the apparatus.

Clause 9. The apparatus of clause 8, the means being configured for receiving from the selected user apparatus a report indicating the processing time of the message at the selected user apparatus to the apparatus. For example, the selected user apparatus being a user equipment may send the report as part of the UE capability.

Clause 10. The apparatus of any of the preceding clauses 1 to 9, wherein the means are configured for repeating the steps A), B), C) and D). In each repletion, a different user apparatus may, for example, be selected. The repetition may, for example, be performed until all the user apparatuses have been selected or upon receiving a stopping request e.g., from one of the selected user apparatuses.

Clause 11. The apparatus of any of the preceding clauses 1 to 10, wherein the means are configured for repeating the steps B), C) and D) until a stopping criterion is fulfilled. The stopping criterion may, for example, require that the selected user apparatus is not served anymore (disconnected) by the network apparatus or that a maximum number of repetitions is reached or upon receiving a stopping request e.g., from the selected user apparatus.

Clause 12. The apparatus of any of the preceding clauses 1 to 11, the means being configured for automatically performing steps A), B), C) and D).

Clause 13. The apparatus of any of the preceding clauses 1 to 11, the means being configured for performing steps A), B), C) and D) upon receiving a request for a timing information.

Clause 14. A non-transitory computer readable medium comprising program instructions that, when executed by an apparatus, cause the apparatus to perform at least the following: selecting a user apparatus of a set of user apparatuses; using resources for the set of user apparatuses for selecting a scheduled transmission time for the selected user apparatus; estimating a propagation time of a message from the apparatus to the selected user apparatus; estimating an arrival time of the message at the selected user apparatus using the scheduled transmission time and the propagation time; providing according to the scheduled transmission time a message including the estimated arrival time.

Clause 15. A user apparatus comprising: at least one processor; and at least one memory storing instructions that, when executed by the at least one processor, cause the user apparatus at least to perform: receiving a message from another apparatus, the message comprising an arrival time of the message at the user apparatus; setting a system time of the user apparatus according to the arrival time.

Clause 16. The user apparatus of clause 15, being an automation apparatus of a manufacturing automation system or a user equipment.

Clause 17. The user apparatus of clause 15 or 16, the means being further configured for downloading a clock application from a service provider, wherein the clock application is configured to perform the setting o the system time Clause 18. A non-transitory computer readable medium comprising program instructions that, when executed by a user apparatus, cause the user apparatus to perform at least the following: receiving a message from another apparatus, the message comprising an arrival time of the message at the user apparatus; setting a system time of the user apparatus according to the arrival time.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

Generally, the program instructions can be executed on one processor or on several processors. In the case of multiple processors, they can be distributed over several different entities. Each processor could execute a portion of the instructions intended for that entity. Thus, when referring to a system or process involving multiple entities, the computer program or program instructions are understood to be adapted to be executed by a processor associated or related to the respective entity.

The invention claimed is:

1. An apparatus for time synchronization in a wireless communication system using resources which are allocated in time domain for a set of user apparatuses of the wireless communication system, the apparatus comprising:
at least one processor; and
at least one memory storing instructions that, when executed by the at least one processor, causes the apparatus to perform:
selecting a user apparatus of the set of user apparatuses;
using the allocated resources for selecting a scheduled transmission time for the selected user apparatus;
estimating a propagation time of a message from the apparatus to the selected user apparatus;
estimating an arrival time of the message at the selected user apparatus using the scheduled transmission time and the propagation time;
providing according to the scheduled transmission time a message including the estimated arrival time.

2. The apparatus of claim 1, wherein the instructions, when executed by the at least one processor, cause the apparatus to perform the providing the message by sending the message at the scheduled transmission time to the selected user apparatus.

3. The apparatus of claim 1, wherein the selected user apparatus comprises a user apparatus which is scheduled to receive data at the scheduled transmission time.

4. The apparatus of claim 1, wherein the instructions, when executed by the at least one processor, further cause the apparatus to perform the selecting the user apparatus by:

determining a set of distances between the set of user apparatuses and the apparatus; and selecting the user apparatus using the set of distances.

5. The apparatus of claim 1, wherein the providing of the message comprises broadcasting the message at the scheduled transmission time, and wherein the selected user apparatus has the largest distance of the set of distances.

6. The apparatus of claim 1, wherein the instructions, when executed by the at least one processor, cause the apparatus to perform estimating the arrival time by further using an estimated processing time of the message at the apparatus and the selected user apparatus.

7. The apparatus of claim 6, the processing time being used in case a required time accuracy at the user apparatus is higher than a threshold.

8. The apparatus of claim 6, wherein the estimation of the arrival time is performed using the sum of the scheduled transmission time, the propagation time and the processing time.

9. The apparatus of claim 1, the resources being allocated according to a Time Division Duplex (TDD) technique, the scheduled transmission time being the start time of a TDD subframe plus an offset time of a selected time slot within said TDD subframe.

10. The apparatus of claim 1, wherein the instructions, when executed by the at least one processor, cause the apparatus to automatically perform the selecting of the user apparatus, the estimating of the propagation time, the estimating of the arrival time and the providing of the message.

11. The apparatus of claim 1, wherein the instructions, when executed by the at least one processor, cause the apparatus to perform the selecting of the user apparatus, the estimating of the propagation time, the estimating of the arrival time and the providing of the message upon receiving a request for a timing information.

12. The apparatus of claim 1, being comprised in a base station or a core network node of the wireless communication system, the set of user apparatuses being user equipments.

13. A method for time synchronization in a wireless communication system using resources which are allocated in time domain for a set of user apparatuses of the wireless communication system, the method comprising:

selecting a user apparatus of the set of user apparatuses;

using the allocated resources for selecting a scheduled transmission time for the selected user apparatus;

estimating a propagation time of a message from the apparatus to the selected user apparatus;

estimating an arrival time of the message at the selected user apparatus using the scheduled transmission time and the propagation time;

providing according to the scheduled transmission time a message including the estimated arrival time.

14. A user apparatus, comprising:

at least one processor; and at least one memory storing instructions that, when executed by the at least one processor, causes the apparatus to perform:

receiving a message from another apparatus, the message comprising an arrival time of the message at the user apparatus;

setting a system time of the user apparatus according to the arrival time.

15. The user apparatus of claim 14, wherein the user apparatus comprises an automation apparatus of a manufacturing automation system or a user equipment.

16. The user apparatus of claim 14, wherein the instructions, when executed by the at least one processor, further cause the apparatus to download a clock application from a service provider, wherein the clock application is configured to perform the setting of the system time.

*     *     *     *     *